United States Patent
Mendonsa et al.

(10) Patent No.: US 10,861,496 B1
(45) Date of Patent: Dec. 8, 2020

(54) STORAGE DEVICES FOR EXTERNAL DATA ACQUISITION

(71) Applicant: Seagate Technology LLC, Cupertino, CA (US)

(72) Inventors: Riyan Alex Mendonsa, Edina, MN (US); Jon D. Trantham, Chanhassen, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/451,809

(22) Filed: Jun. 25, 2019

(51) Int. Cl.
*G11B 33/00* (2006.01)
*G11B 20/10* (2006.01)
*G11B 5/02* (2006.01)
*G06F 3/06* (2006.01)

(52) U.S. Cl.
CPC ...... *G11B 20/10037* (2013.01); *G06F 3/0604* (2013.01); *G06F 3/0629* (2013.01); *G06F 3/0679* (2013.01); *G11B 5/02* (2013.01)

(58) Field of Classification Search
CPC .. G11B 33/00; G11B 3/34; G11B 3/36; G11B 5/027; G11B 13/19665; G11B 15/02; G11B 5/09; G01V 3/34
USPC .................................................. 360/5, 75, 7
See application file for complete search history.

(56) References Cited

U.S. PATENT DOCUMENTS

| | | | |
|---|---|---|---|
| 6,973,535 B2 | 12/2005 | Bruner et al. | |
| 7,558,013 B2* | 7/2009 | Jeansonne | G01P 15/0891 360/60 |
| 7,689,373 B1* | 3/2010 | Lane, Jr. | G01H 1/003 348/207.1 |
| 9,401,174 B2 | 7/2016 | Howley et al. | |
| 9,811,174 B2* | 11/2017 | Nasiri | G06F 3/017 |
| 2008/0055778 A1* | 3/2008 | Katou | G11B 5/09 360/234.5 |
| 2012/0148108 A1* | 6/2012 | Yahata | G01S 11/12 382/106 |
| 2017/0098363 A1* | 4/2017 | Pickett | G01M 99/008 |
| 2018/0189720 A1* | 7/2018 | Henderson | G06Q 10/087 |

* cited by examiner

*Primary Examiner* — Nabil Z Hindi
(74) *Attorney, Agent, or Firm* — Faegre Drinker Biddle & Reath LLP

(57) ABSTRACT

A system includes a system-on-a-chip integrated circuit and a preamplifier integrated circuit. The system-on-a-chip integrated circuit includes an interface configured to receive an analog sensor signal and a read/write channel configured to digitize the analog sensor signal. The preamplifier integrated circuit is communicatively coupled to the system-on-a-chip integrated circuit and is configured to amplify the analog sensor signal.

16 Claims, 4 Drawing Sheets

STORAGE DEVICES FOR EXTERNAL DATA ACQUISITION

SUMMARY

In certain embodiments, a method is disclosed for using a data storage device with circuitry, an interface for communicating signals to and from the data storage device, and data storage memory. The method includes receiving, via the interface, a raw analog sensor signal; digitizing, via the circuitry, the raw analog sensor signal; converting the digitized analog sensor signal for storage to the data storage memory; and storing the converted digitized analog sensor signal to the data storage memory.

In certain embodiments, a data storage device includes magnetic recording media, an interface for receiving an analog sensor signal, and circuitry. The circuitry is configured to digitize the analog sensor signal, convert the digitized analog sensor signal for storage to the data storage memory, and direct the converted digitized analog sensor signal to the data storage memory.

In certain embodiments, a system includes a system-on-a-chip integrated circuit and a preamplifier integrated circuit. The system-on-a-chip integrated circuit includes an interface configured to receive an analog sensor signal and a read/write channel configured to digitize the analog sensor signal. The preamplifier integrated circuit is communicatively coupled to the system-on-a-chip integrated circuit and is configured to amplify the analog sensor signal.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
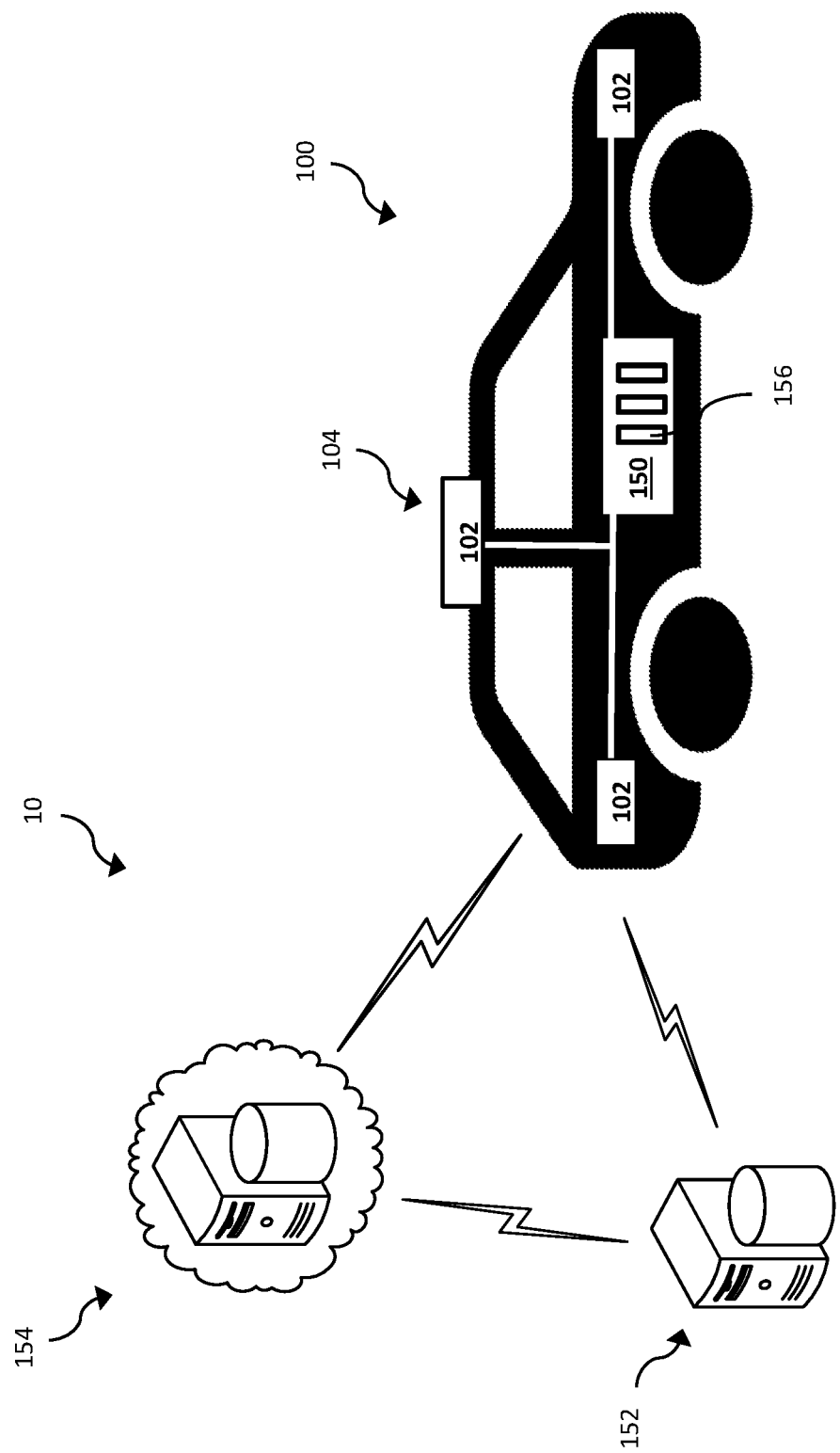
FIG. 1 shows a schematic of an ecosystem with a vehicle with a data storage system, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Connected ecosystems such as ecosystems with autonomous or semi-autonomous vehicles need equipment that can quickly process and store vast amounts of data, including raw analog sensor signals. The equipment required to meet such needs is typically expensive and bulky. Certain embodiments of the present disclosure are accordingly directed to data storage devices (e.g., hard disk drives, solid state drives) to process and store data acquired in connected ecosystems—thus reducing the need for separate processing and storage equipment.

FIG. 1 shows a schematic of an ecosystem 10 with a vehicle 100 such as an autonomous or semi-autonomous vehicle. The vehicle 100 includes sensors 102 (e.g., optical sensors such as photodetectors) positioned at various points around the vehicle 100. In certain embodiments, the sensors 102 are part of LIDAR (light detection and ranging) devices 104. LIDAR devices 104 transmit pulsed light from the vehicle 100 that may be reflected back from objects surrounding the vehicle 100. The reflected light is detected by the sensors 102, which in turn generate sensor signals (e.g., raw analog sensor signals with varying amplitudes over time). The sensor signals are used by the LIDAR device 104 (or separate data processing devices) to determine the distance between the LIDAR device 104 and the object(s) that reflected the light. Thus, the sensor signals are used to detect objects around the vehicle 100.

The vehicle 100 may include multiple LIDAR devices 104 each with one or more sensors 102. For example, the vehicle 100 may include LIDAR devices 104 that are arranged to help detect objects relatively near the vehicle 100 and other LIDAR devices 104 that are arranged to detect objects relatively far from the vehicle 100. In some embodiments, the sensors 102 may be physically separate from the LIDAR devices 104. In an ecosystem 10 with autonomous or semi-autonomous vehicles, the sensor signals generated by the sensors 102 are typically analyzed and stored. For example, the ecosystem 10 can include a first data storage system 150 that is positioned on the vehicle 100 and that may store the sensor signals to maintain a record of data (including the sensor signals and other vehicle data) for analysis should the vehicle 100 get involved in an accident, similar to an airplane's "black box." The ecosystem 10 can also include a second data storage system 152 that is separate from the vehicle 100 but that is communicatively coupled to the first data storage system 150 to offload data from the vehicle's first data storage system 150. In certain embodiments, the second data storage system 152 represents "edge" data storage centers with "edge" data computing capabilities. The ecosystem 10 can include a third data storage system 154 representing cloud-based data storage systems or data centers that are communicatively coupled to the vehicle's first data storage system 150 and the second data storage 152. The third data storage system 154 may provide data backup services to the first data storage system 150 and the second data storage system 152. Further yet, the ecosystem 10 can include multiple vehicles each with their own data storage system that communicates with the vehicle 100, other vehicles in the ecosystem 10, and the various data storage systems in the ecosystem 10.

The vehicle's sensors 102 generate a large amount of data in the form of raw analog sensor signals that need to be quickly digitized (e.g., at speeds on the order of 5 GHz) and conditioned for storage. The various data storage systems in the ecosystem 10 include one or more data storage devices 156 (e.g., hard disk drives, solid state drives) that can be used for such digitization and conditioning of the analog sensor signals. As will be explained in more detail below, the data storage devices 156 include features such as one or more integrated circuit components such as preamplifiers and systems-on-a-chip that can be used to reduce the need for expensive and bulky signal processing equipment external to the data storage devices 156. Further, the data storage devices 156 include one or more read/write channels that can facilitate communication between the data storages devices 156 and the external devices (e.g., the sensors 102 and the LIDAR devices 104) and the data storage systems. Although the data storage systems and data storage devices are described above as being implemented in connection with autonomous vehicles, the data storage systems and data storage devices can be used in other environments or ecosystems where analog signals need to be digitized and stored.

Figure 2:
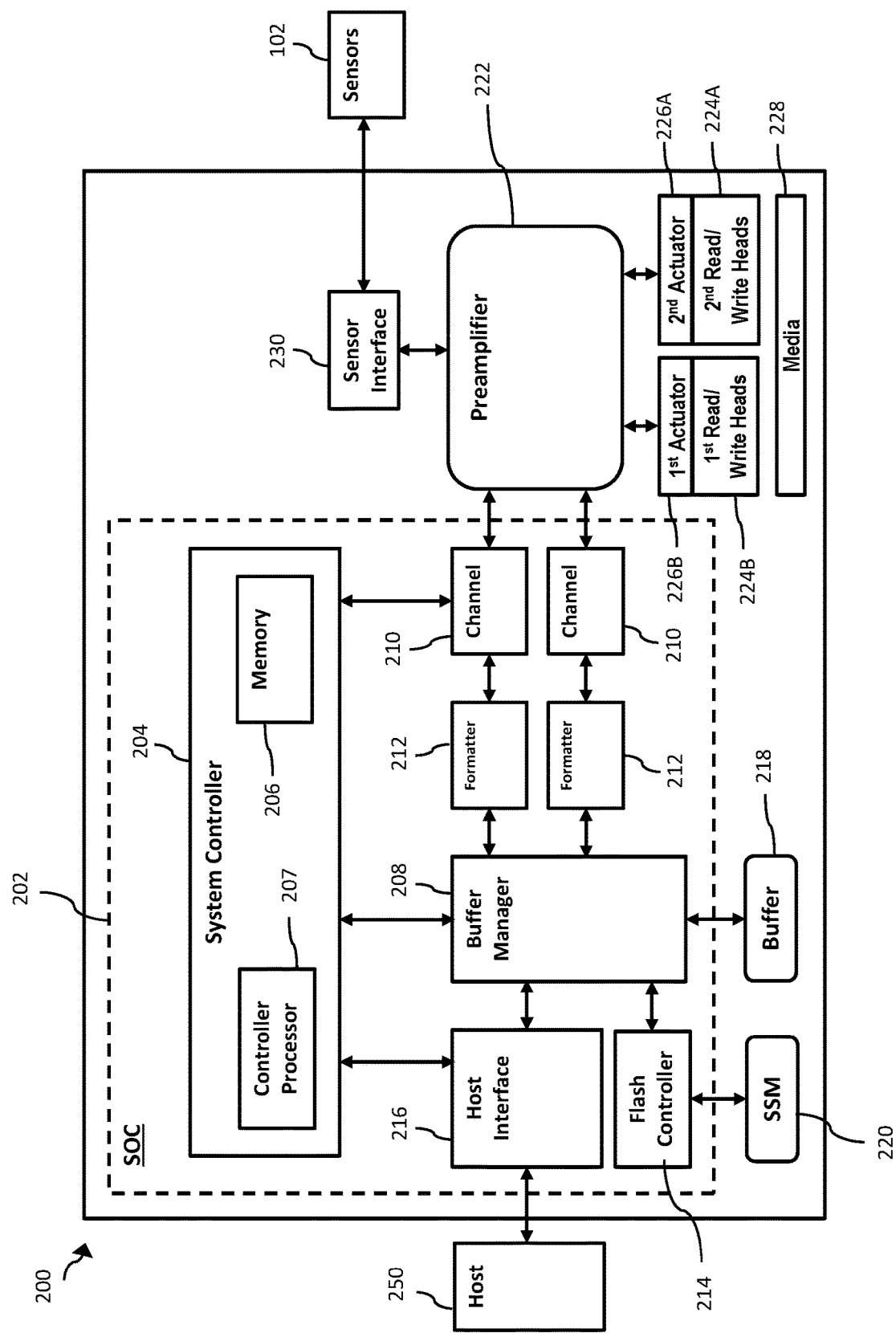
FIG. 2 shows a simplified schematic of hard disk drive, in accordance with certain embodiments of the present disclosure.
Figure 3:
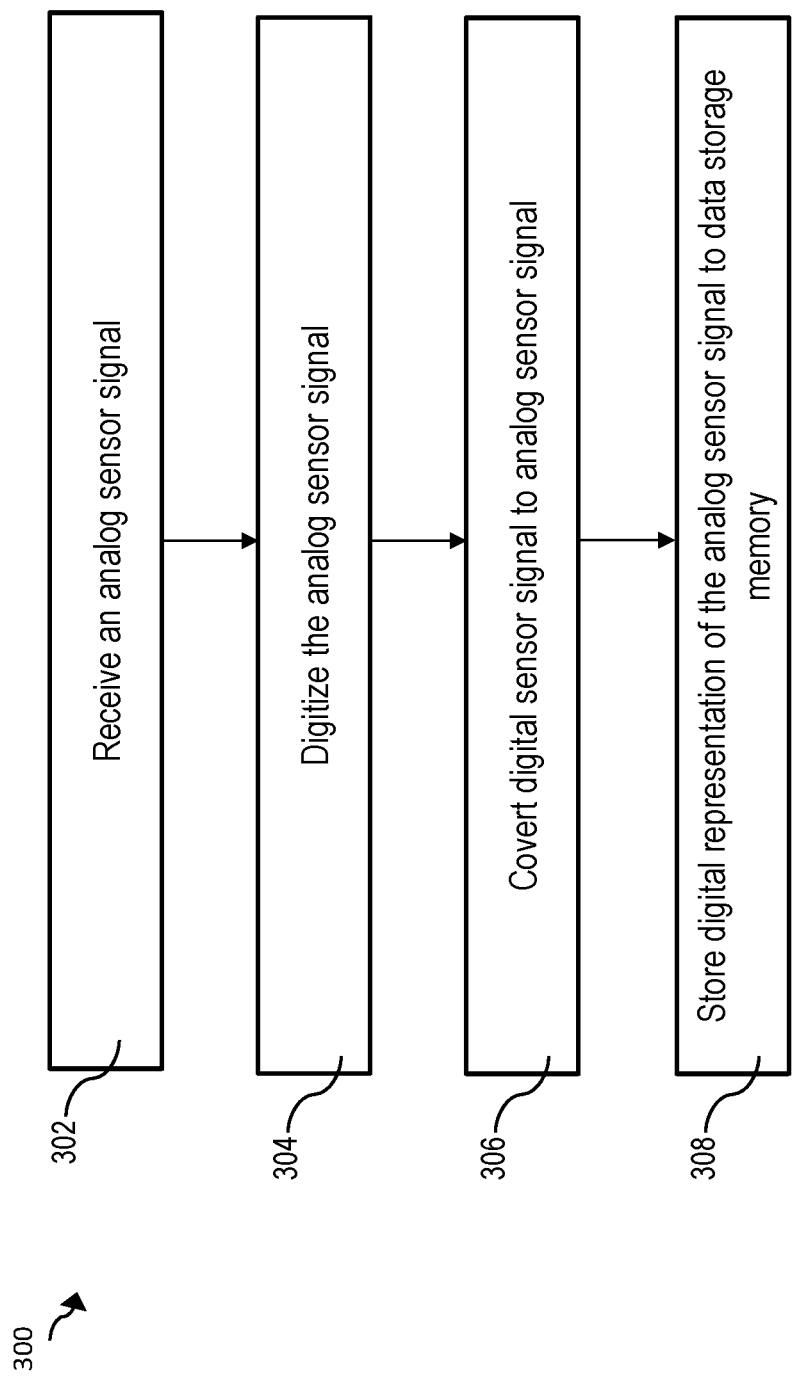
FIG. 3 shows a simplified schematic of solid state drive, in accordance with certain embodiments of the present disclosure.
Figure 4:
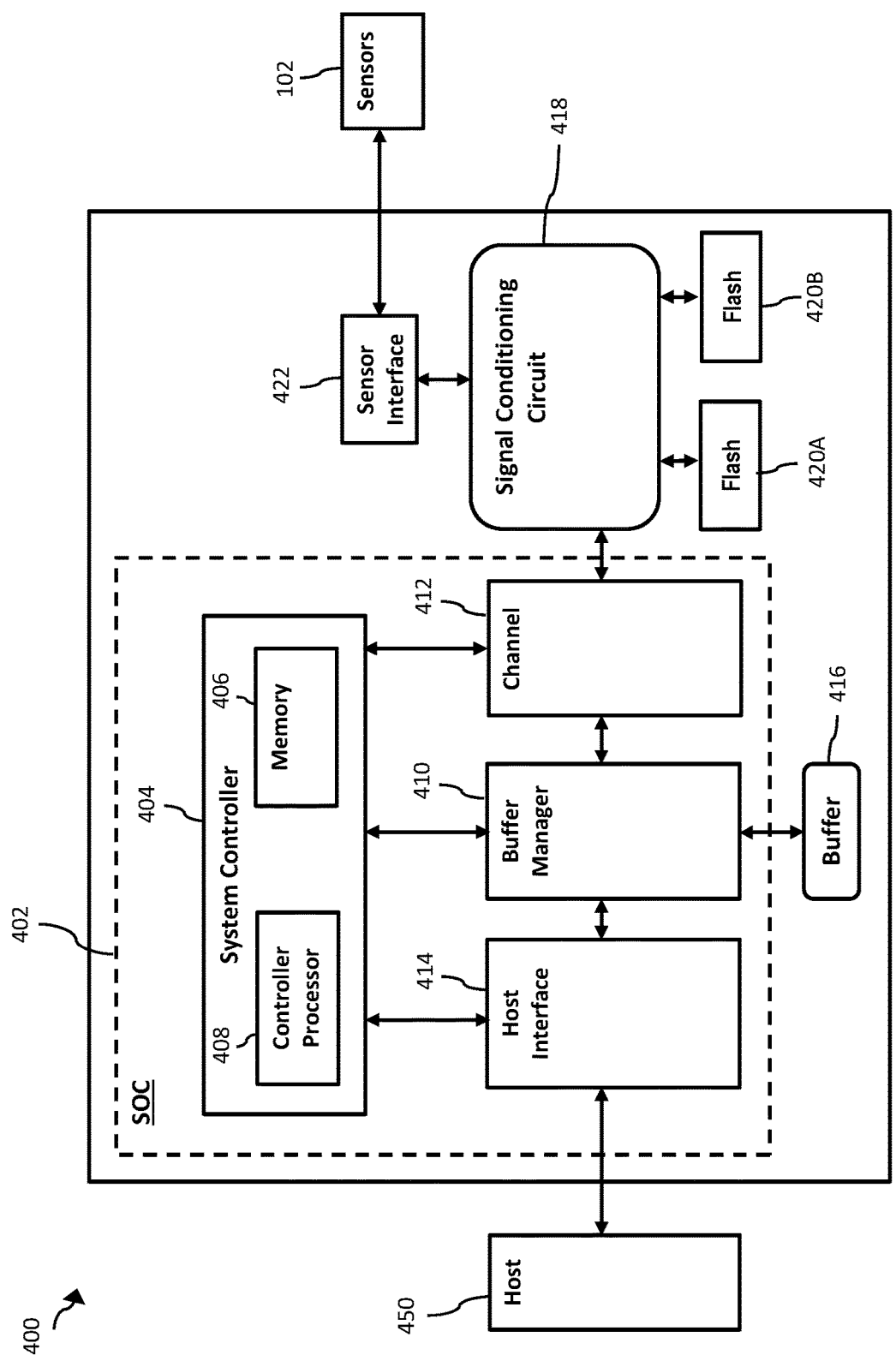
FIG. 4 depicts a block diagram of steps of a data transfer method, in accordance with certain embodiments of the present disclosure.

FIGS. 2 and 4 show example data storage devices that can be incorporated into the various data storage systems of FIG. 1 and vehicles in the ecosystem 10. FIG. 2 shows a schematic of a hard disk drive 200, and FIG. 4 shows a schematic of a solid state drive 400. FIG. 3 shows various steps of a method that can be carried out by the hard disk drive 200 and/or the solid state drive 400. Although only a hard disk drive and a solid state drive are shown, any data storage device with a signal conditioning system could be used in the manner described below.

FIG. 2 shows a block schematic of the hard disk drive 200 with a system on a chip ("SOC") 202 that includes a system controller 204 and its associated memory 206 and a controller processor 207, a buffer manager 208, one or more read/write channels 210, one or more formatters 212, a flash controller 214, and a host interface 216.

The SOC 202 may be an integrated circuit such as an application-specific integrated circuit ("ASIC"), field-programmable gate array ("FPGA"), or other processor-based integrated circuits that include instructions (e.g., firmware) for carrying out various functions of the hard disk drive 200.

The system controller 204 can control access to a buffer 218, which can temporarily store data associated with read commands and write commands. The buffer 218 can be a volatile memory, such as a dynamic random access memory ("DRAM"), static random access memory ("SRAM"), or other volatile memory.

The read/write channel 210 facilitates communication within the hard disk drive 200 and can encode data associated with write commands and decode data associated with read commands. The read/write channel 210 may be coupled to the one or more formatters 212 located between the read/write channel 210 and the flash controller 214. The flash controller 214 is coupled to solid state memory 220, which may be a volatile memory, such as DRAM, or a non-volatile memory, such as flash memory (e.g., NAND) and the like.

The host interface 216 (e.g., an input/output interface) is configured to transfer data to and from the hard disk drive 200. For example, the host interface 216, among other features, can communicatively couple the hard disk drive 200 and a host 250 (e.g., a data storage system such as a server).

The hard disk drive 200 includes a preamplifier 222 coupled between the SOC 202 and read/write heads 224A and 224B. Like the SOC 202, the preamplifier 222 may be an integrated circuit such as an ASIC, FPGA, or other processor-based integrated circuits that include instructions (e.g., firmware) for carrying out various functions of the hard disk drive 200. The preamplifier 222 processes (e.g., conditions and distributes) and amplifies analog signals directed to and from the read/write channel(s) 210. The read/write channel(s) 210 digitize the analog signals for reading and writing data to the magnetic recording media 208 via the read/write heads 224A and 224B.

The read/write heads 224A and 224B are coupled to respective first and second actuators 226A and 226B that position the read/write heads 224A and 224B over desired data tracks on data storage memory (e.g., magnetic recording media 228) to induce or read magnetic transitions on the data tracks. Although multiple actuators are shown in FIG. 2, the hard disk drive 200 can include fewer or more actuators.

The hard disk drive 200 can also include a sensor interface 230 coupled between the preamplifier 222 and sensors, such as the sensors 102 of FIG. 1, positioned external to the hard disk drive 200. In certain embodiments, the sensor interface 230 is an interface that is separate from the host interface 216 while in other embodiments the sensor interface 230 utilizes one or more channels (e.g., conductive pins) of the host interface 216. In such embodiments, the preamplifier 222 may be coupled to the host interface 216 such that the preamplifier 222 is functionally coupled between the host interface 216 and the read/write channel 210, so that the raw analog sensor signal can be conditioned before being digitized by the read/write channel 210. In certain embodiments, the sensor interface 230 is coupled to multiple sensors external to the hard disk drive 200 and therefore is able to process and condition multiple sensor signals. Although only one sensor interface 230 is depected in FIG. 2, multiple separate interfaces could be incorporated into the hard disk drive 200.

As alluded to above, the hard disk drive's circuitry (e.g., the SOC 202 and/or preamplifier 222) can be used to digitize, condition, and analyze raw analog sensor signals generated by sensors external to the hard disk drive 200. As such, the hard disk drive 200 receives and stores different types of signals than traditional hard disk drives. For example, traditional hard disk drives receive data transfer commands from a host (e.g., laptop, server), which then sends or receives data in a digital computer-readable format—as opposed to receiving raw analog sensor signals directly or indirectly from sensors. As described in more detila below, the raw analog sensor signals can be processed by the hard disk drive 200 such that digital representations of the raw analog signals are stored to the magnetic recording media 208 in the form of magnetic transitions representing (unmodified) raw analog sensor signals.

FIG. 3 shows an example method 300 that can be carried out by the hard disk drive 200. Although described in the context of the hard disk drive 200, the method 300 can also be carried out by similar components (e.g., integrated circuitry) of the solid state drive 400 (described in more detail below) and other data storage devices with signal conditioning capabilities. Further, the various steps can be performed in different orders than described below.

The method 300 includes receiving, via an interface (e.g., the host interface 216 or the sensor interface 230), a raw analog sensor signal from a sensor external to the hard disk drive 200 (block 302 in FIG. 3). The raw sensor signal is converted to a digital sensor signal by the hard disk drive's SOC 202 (block 304 in FIG. 3). For example, the read/write channel 210 can digitize the raw analog sensor signal. In certain embodiments, the raw analog sensor signal is first processed by the preamplifier 222 such that the sensor signal is better conditioned for digitization by the read/write channel 210. In certain embodiments, the read/write channel 210 does not apply any error correction techniques when processing the raw analog sensor signal.

The digitized sensor signal can analyzed and processed by the system controller 204. For example, system controller 204 may be programmed to detect certain characteristics (e.g., amplitudes) of the sensor signal. The detected characteristics can be indicative of one of the LIDAR devices 104 having detected an object. The data (e.g., amplitudes, timing, and the like) resulting from analyzing the sensor signal can be compiled to create a processed sensor signal. The processed sensor signal can be stored to the magnetic recording media 208. In certain embodiments, the system controller 204 is used by the external devices (e.g., the LIDAR device 104) for computations or decisions. For example, the system controller 204 can detect certain characteristics of the sensor signal (e.g., amplitudes indicating object detection) and such detected characteristics can be communicated back to the external devices.

The digitized sensor signal can then be converted back to an analog sensor signal (block 306 in FIG. 3) that is compatible with the hard disk drive's write transducers positioned on read/write heads 224A and 224B. A digital representation of the analog sensor signal is then stored to the magnetic recording media 208 (block 308 in FIG. 3) in the form of magnetic transitions representing 1's and 0's. For example, the read/write channel 210 can convert the digital sensor signal to an analog form that is sent to the preamplifier 222. The preamplifier 222 can then condition the analog sensor signal so that the write transducers can store a digital representation to the magnetic recording media 208. Put another way, the preamplifier 222 conditions the analog sensor signal such that the write transducers of the read/write heads 224A and 224B can induce magnetic transitions on the magnetic recording media 208 that represent the raw analog sensor signal.

FIG. 4 shows a block schematic of the solid state drive 400 with an SOC 402, which includes a system controller 404 and its associated memory 406 and a controller processor 408, a buffer manager 410, one or more communication channels 412, and a host interface 414. The SOC 402 may be an integrated circuit such as an ASIC, FPGA, or other processor-based integrated circuits that include instructions (e.g., firmware) for carrying out various functions of the solid state drive 400.

The system controller 404 can control access to a buffer 416, which can temporarily store data associated with read commands and write commands. The buffer 416 can be a volatile memory, such as a DRAM, SRAM, or other volatile memory.

The communication channel 412 facilitates communication within the solid state drive 400. The host interface 414 (e.g., an input/output interface) is configured to transfer data to and from the solid state drive 400. For example, the host interface 414, among other features, can communicatively couple the solid state drive 400 and a host 450 (e.g., a data storage system such as a server).

The solid state drive 400 includes a signal conditioning circuit 418 coupled between the SOC 402 and data storage memory (e.g., flash memory cells 420A and 420B). The solid state drive 400 can also include a sensor interface 422 coupled between one or more sensors 102 external to the solid state deive 400 and the signal conditioning circuit 418. In certain embodiments, the sensors 102 are coupled to the host interface 414. In certain embodiments, the solid state drive 400 includes multiple interfaces for coupling to sensors external to the solid state drive 400 and therefore is able to process and condition multiple sensor signals.

The signal conditioning circuit 418 processes (e.g., conditions and distributes) analog signals to and from the communication channel 412 and the flash memory cells 420A and 420B. The communication channel 412 includes an analog-to-digital converter, which digitizes the analog sensor signals. The signal conditioning circuit 418 conditions the digitize analog sensor signals for storage to the flash memory cells 420A and 420B. Although the memory cells 420A and 420B are described as flash memory cells, other types of data storage cells (e.g., ReRAM, ST-RAM, FeRAM, MRAM) can be used.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for using a data storage device with an interface for communicating signals to and from the data storage device, data storage memory, and a system-on-a-chip (SoC) with a read/write channel, the method comprising:
   receiving, via the interface of the data storage device, a raw analog sensor signal;
   digitizing, via the read/write channel of the SoC, the raw analog sensor signal after receiving the raw analog sensor signal from the interface of the data storage device;
   converting the digitized analog sensor signal for storage to data storage memory; and
   storing the converted digitized analog sensor signal to the data storage memory,
   wherein the data storage device is a hard disk drive or a solid state drive.

2. The method of claim 1, further comprising:
   processing, via the SoC, the raw analog sensor signal to generate a processed sensor signal; and
   storing the processed sensor signal to the magnetic recording media.

3. The method of claim 2, wherein the processing the raw analog sensor signal includes detecting different amplitudes of the analog sensor signal.

4. The method of claim 3, wherein the stored processed sensor signal includes data indicative of detecting an object.

5. The method of claim 1, wherein the raw analog sensor signal is received from a sensor external to the data storage device.

6. The method of claim 1, wherein the SoC does not apply error correction to the raw analog signal before storing the converted digitized analog sensor signal.

7. The method of claim 1, further comprising: communicating, via the SoC and the interface, with a device external to the data storage device.

8. The method of claim 1, wherein the SoC includes a system controller.

9. A hard disk drive comprising:
   a magnetic recording medium including data tracks;
   an interface for receiving an external analog sensor signal; and
   a system-on-a-chip (SoC) with a read/write channel, the SoC configured to:
      digitize, via the read/write channel, the external analog sensor signal,
      convert, via the read/write channel, the digitized analog sensor signal for storage to the magnetic recording medium, and
      direct the converted digitized analog sensor signal to the magnetic recording medium.

10. The hard disk drive of claim 9, further comprising a preamplifier integrated circuit configured to amplify the converted digitized analog sensor signal.

11. The hard disk drive of claim 9, wherein the SoC includes a system controller configured to detect different amplitudes of the sensor signal and generate a processed sensor signal.

12. The hard disk drive of claim 9, further comprising:
a second interface for communicating with a host system.

13. A solid state drive data storage device comprising:
data storage memory;
an interface of the solid state drive data storage device for receiving an analog sensor signal; and
a system-on-a-chip (SoC) with a read/write channel, the SoC configured to:
digitize, via the read/write channel, the analog sensor signal received via the interface,
convert the digitized analog sensor signal for storage to the data storage memory, and
direct the converted digitized analog sensor signal to the data storage memory.

14. The solid state drive data storage device of claim 13, wherein the SoC includes an interface configured to receive an analog sensor signal, wherein the solid state drive data storage device further includes a signal conditioning circuit communicatively coupled to the SoC and configured to amplify the analog sensor signal.

15. The solid state drive data storage device of claim 14, wherein the SoC includes a system controller configured to detect different amplitudes of the sensor signal and generate a processed sensor signal.

16. The solid state drive data storage device of claim 13, further comprising:
a second interface for communicating with a host system.

* * * * *